United States Patent [19]

Watanabe et al.

[11] Patent Number: 5,594,717
[45] Date of Patent: Jan. 14, 1997

[54] CALL ADMISSION CONTROL IN ATM NETWORK

[75] Inventors: Yoshihiro Watanabe; Junichi Yamazaki, both of Kawasaki; Norihito Nishimoto; Yoshiharu Sato, both of Fukuoka; Shunji Abe; Toshio Soumiya, both of Kawasaki, all of Japan

[73] Assignee: Fujitsu Limited, Kanagawa, Japan

[21] Appl. No.: 601,845

[22] Filed: Feb. 15, 1996

Related U.S. Application Data

[63] Continuation of Ser. No. 373,453, Jan. 17, 1995, abandoned, which is a continuation of Ser. No. 87,807, filed as PCT/JP92/01495, Nov. 16, 1992, published as WO94/11971, May 26, 1994, abandoned.

[51] Int. Cl.$^6$ ............................................. H04J 3/14
[52] U.S. Cl. .................... 370/232; 370/395; 379/111; 379/134
[58] Field of Search ............................. 370/17, 60, 60.1, 370/94.1, 94.2; 379/111, 112, 113, 133, 134

[56] References Cited

U.S. PATENT DOCUMENTS

| | | | |
|---|---|---|---|
| 4,984,264 | 1/1991 | Katsube | 370/60 |
| 5,038,345 | 8/1991 | Roth | 370/94.1 |
| 5,166,894 | 11/1992 | Saito | 370/94.1 |
| 5,280,483 | 1/1994 | Kamoi et al. | 370/94.1 |

FOREIGN PATENT DOCUMENTS

| | | | |
|---|---|---|---|
| 2-220531 | 9/1990 | Japan | H04L 12/48 |
| 3-235550 | 10/1991 | Japan | H04L 12/48 |
| 4-058641 | 2/1992 | Japan | H04L 12/48 |
| 4-079542 | 3/1992 | Japan | H04L 12/48 |
| 4-095432 | 3/1992 | Japan | H04L 12/48 |

OTHER PUBLICATIONS

Saito, Hiroshi, "A Simplified Dimensioning Method of ATM Networks," *IEICE Technical Report* (SSE89–112), 1989, pp. 25–30.

*Primary Examiner*—Benedict V. Safourek
*Assistant Examiner*—Russell Blum
*Attorney, Agent, or Firm*—Staas & Halsey

[57] ABSTRACT

A correct admission decision can be made even when not relying upon traffic characteristics declared by a user. With respect to each of established connections, traffic data are acquired and are stored. When a call request is issued, an admission decision is made using the traffic characteristics if the traffic characteristics are stored.

32 Claims, 12 Drawing Sheets

Fig.4A

| Subscriber | Declared values (average, peak, etc.) | Observed values (average, peak, etc.) |
|---|---|---|
| 2-6141 | Average10Mb/s. Peak50Mb/s | Average30Mb/s. Peak70Mb/s |
| 2-6142 | | |
| 2-6143 | | |

Fig. 4B

| Subscriber | Declared values | Observed values |
|---|---|---|
| 2-6141 | Average10Mb/s. Peak50Mb/s | Average30Mb/s. Peak70Mb/s. |
| | Average64Kb/s. Peak64Kb/s. | Average64Kb/s. Peak64Kb/s. |
| 2-6142 | | |
| 2-6143 | | |

Fig. 4C

| Subscriber | Declared values | Observed values |
|---|---|---|
| 2-6141 | Average10Mb/s. Peak50Mb/s. | Average20Mb/s. Peak60Mb/s. |
| | Average64Kb/s. Peak64Kb/s. | Average64Kb/s. Peak64Kb/s. |
| 2-6142 | | |
| 2-6143 | | |

Fig. 5

| Subscriber | Time period | Declared values | Observed values |
|---|---|---|---|
| 2-6141 | 0:00-6:00 | Average10Mb/s. Peak50Mb/s. | Average20Mb/s. Peak60Mb/s. |
| | ⋮ | | |
| | 21:00-24:00 | Average 10Mb/s. Peak 50Mb/s | Average 30Mb/s. Peak 70Mb/s. |
| | | Average 64Kb/s. Peak 64Kb/s. | Average 64Kb/s. Peak 64Kb/s. |
| ⋮ | | | |
| ⋮ | | | |

Fig. 6

| Subscriber | Called party | Declared values | Observed values |
|---|---|---|---|
| 2-6141 | 2-1111 | Average10Mb/s. Peak50Mb/s. | Average20Mb/s. Peak60Mb/s. |
| | ⋮ | | |
| | 2-9999 | Average 10Mb/s. Peak 50Mb/s | Average 30Mb/s. Peak 70Mb/s. |
| | | Average 64Kb/s. Peak 64Kb/s | Average 64Kb/s. Peak 64Kb/s. |
| ⋮ | | | |
| ⋮ | | | |

Fig.7

| Subscriber | Called party | Time period | Declared values | Observed values |
|---|---|---|---|---|
| 2-6141 | 2-1111 | 0:00-6:00 | | |
| | | ⋮ | | |
| | | 21:00-24:00 | | |
| | 2-2222 | | | |
| | | | | |
| | | | | |
| ⋮ | ⋮ | | | |
| | | | | |

Fig.8

| Subscriber | Declared values | Average | Observation times |
|---|---|---|---|
| 2-6141 | | | |
| 2-6142 | | | |
| 2-6143 | | | |

Fig.9

| Subscriber | Declared values | Average | Observation times | Sum of square of observed values |
|---|---|---|---|---|
| | | | | |
| | | | | |
| | | | | |

Fig.10

| Medium type | Average V | Peak P | Burst duration B |
|---|---|---|---|
| Voice | 64Kb/s | 64Kb/s | 5s |
| Moving picture | 70Mb/s | 150Mb/s | 100ms |
| ⋮ | | | |

Fig.11

| Subscriber | Medium type | Observed values | Observation times |
|---|---|---|---|
| 2-6141 | Moving picture | V=50Mb/s. P=110Mb/s. B=50ms | 1 |
| 2-6142 | | | |
| 2-6143 | | | |

Fig.12

| Subscriber | Medium type | Observed values | Observation times |
|---|---|---|---|
| 2-6141 | Moving picture | V=60Mb/s. P=140Mb/s. B=45ms | 2 |
| 2-6142 | | | |
| 2-6143 | | | |

5,594,717

CALL ADMISSION CONTROL IN ATM NETWORK

This application is a continuation of application No. 08/373,453, filed Jan. 17, 1995, now abandoned, which is a continuation of prior application No. 08/087,807, filed as PCT/JP92/01495 Nov. 16, 1992 published as WO94/11971 May 26, 1994, now abandoned.

FIELD OF THE INVENTION

The present invention relates to a method and an apparatus for call admission control in an ATM (Asynchronous Transfer Mode) network.

DESCRIPTION OF THE RELATED ART

In an ATM network, since various types of data, including voice, image, and data communication data, which have various transmission rates and traffic characteristics are statistically multiplexed, call admission control is more complicated than in an STM (Synchronous Transfer Mode) network. When a call request is made, the ATM network determines whether the quality of service would be suitable in all connections, including connections which are already established when the call request is accepted, and determines propriety of the acceptance according to the available services. To make the aforementioned determinations, it is recommended that each terminal issuing a call request should declare parameters, such as an average rate (an average bandwidth) and a peak rate (a peak bandwidth), as source traffic characteristics, and that the call admission control is performed using the declared parameters (CCITT recommendation I. 311).

However, it is not easy for a user to determine exactly his own traffic characteristics. Therefore, if incorrect parameters were declared, incorrect decisions would be made. For example, in a situation where a call request should be rightfully rejected, if the call request was accepted because of an incorrect declaration of too small of a value, required quality of services would not be available, even in connections which are already established.

Even though exact perception would be possible, a range, within which users can perceive it, is limited as far as terminals. If a subscriber network lies between the terminal and an ATM exchange, the traffic characteristics such as a peak bandwidth are varied by the subscriber network.

SUMMARY OF THE PRESENT INVENTION

It is an object of the present invention to provide an apparatus and a method for a call admission control wherein a correct decision for call admission is possible, without relying upon declared parameters of traffic characteristics such as an average bandwidth and a peak bandwidth.

In accordance with the present invention, there is provided a call admission control method for deciding admission of a call request requesting establishment of a connection in an ATM network. The call admission control method comprises steps of:
observing traffic characteristics with respect to every connection which is already established;
storing observed values of the traffic characteristics according to the type of the connection; and
deciding propriety of a call admission in response to the call request, based on observed values if the observed values corresponding to a type of a connection required by the call request is stored, and based on prescribed default values if the observed values corresponding to the type of the connection is not stored.

In accordance with the present invention there is also provided a call admission control apparatus for deciding admission of a call request requesting establishment of a connection in an ATM network. The call admission control apparatus comprises:
a unit for observing traffic characteristics with respect to each of connections which are already established,
a unit for storing observed values of the traffic characteristics according to a type of the connection, and
a unit for deciding propriety of a call admission request, based on observed values if the observed values corresponding to a type of a connection required by the call request are stored, and based on prescribed default values if the observed values corresponding to the type of the connection are not stored.

BRIEF DESCRIPTION OF THE DRAWINGS

FIGS. 4A, 4B and 4C are diagrams showing an example of a storage structure in a case where observed values are stored with respect to each of subscribers and each of declared values;

FIG. 5 is a diagram showing an example of the storage structure in a case where the observed values are stored with respect to each subscriber, each declared value, and each time period of the day;

FIG. 6 is a diagram showing an example of the storage structure in a case where the observed values are stored with respect to each subscriber, each declared value, and each called party.

FIG. 7 is a diagram showing an example of the storage structure in a case where the observed values are stored with respect to each subscriber, each called party and each of period of the day;

FIG. 8 is a diagram showing an example of the storage structure in a case where observation times are stored corresponding to averages to calculate average of the observed values to store;

FIG. 9 is a diagram showing an example of the storage structure in a case where the sum of the squares of the observed values is further stored in order to calculate a variance of the observed values;

FIG. 10 is a diagram showing an example of storage structure of default values of each medium type;

FIGS. 11 and 12 are diagrams showing examples of storage structures in the case where the observed values are stored with respect to each subscriber and each medium type;

DETAILED DESCRIPTION OF THE PRESENT INVENTION

Figure 1:
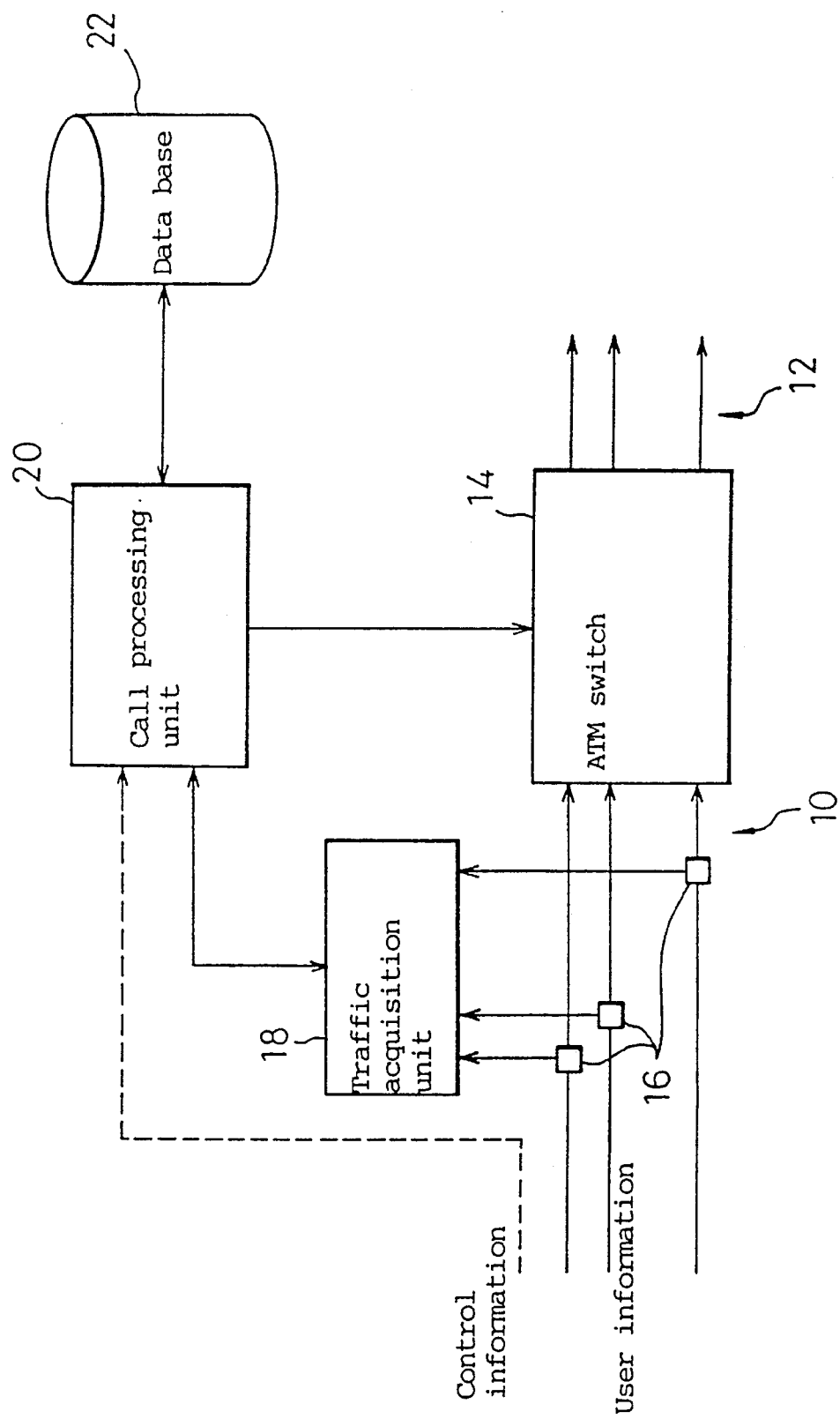
FIG. 1 is a block diagram showing a construction of a call admission control apparatus according to the present invention.

FIG. 1 is a block diagram representing a construction of a call admission control device according to the present invention.

In FIG. 1, an ATM switch 14 has incoming routes 10 and outgoing routes 12. In the incoming route side of the ATM switch 14, header extraction units 16 are provided with respect to each circuit. Headers of ATM cells extracted in the header extraction units 16 are fed to a traffic acquisition unit 18. In response to commands from a call processing unit 20, the traffic acquisition unit 18 continuously counts ATM cells transferred within a prescribed period, separately with respect to each circuit, each VP (virtual path), and VC (virtual channel), stores count values, and reports the counts to the call processing unit 20. The call processing unit 20 determines propriety of acceptance of call requests as control information sent from users, based on data such as traffic values etc. stored in a data base 22. If the call processing unit 20 decides to accept the call request, the call processing unit 20 sets up a connection by controlling the ATM switch 14. Then, the call processing unit 20 commands the traffic acquisition unit 18 to measure the traffic values with respect to the established connection and the measurement results are stored in the data base 22.

Figure 2:
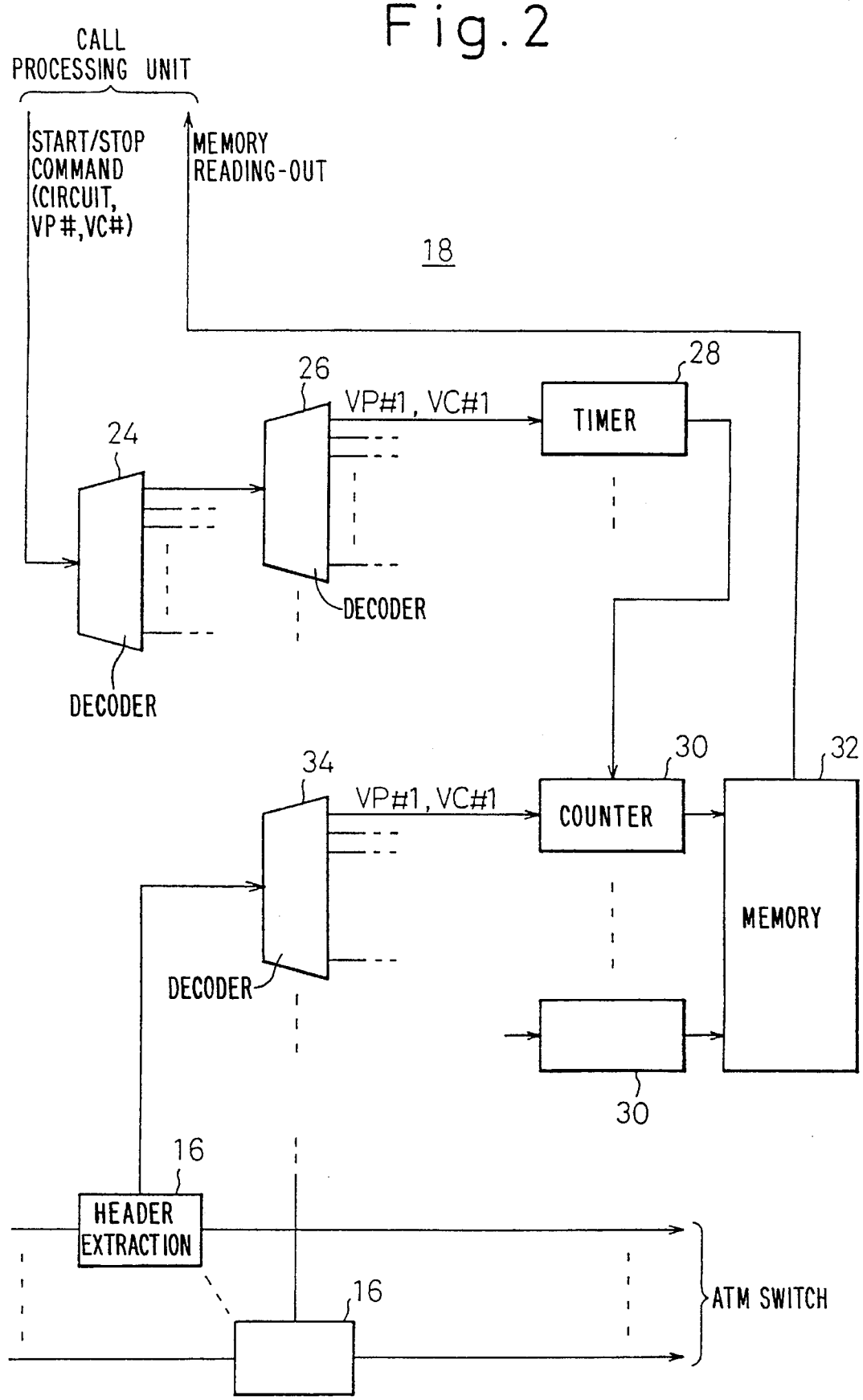
FIG. 2 is a block diagram showing a detailed construction of the traffic acquisition unit 18.

FIG. 2 is a block diagram showing a detailed construction of the traffic acquisition unit 18 shown in FIG. 1. In FIG. 2, measurement start commands and measurement stop commands from the call processing unit 20 shown in FIG. 1 are issued with the designation of a circuit, a VP and a VC. The start/stop commands are distributed in a decoder 24 according to designation of circuits, and then distributed in a decoder 26 according to designation of VPs and VCs. Timers 28 are provided for each VC within each VP belonging to each circuit. When the measurement start command is received, a timer 28 designated by that command outputs a signal for writing a count value of a corresponding counter 30 into a memory 32 and for resetting the counter, at prescribed time intervals until the stop command is received.

Also in FIG. 2, the header extraction units 16 are provided with respect to each circuit. ATM cell headers extracted in the header extraction units 16 are distributed in a decoder 34 according to VP and VC, and are input to the counters 30 to be counted.

In this construction, after initiation of data acquisition is commanded and before interruption is commanded, the numbers of ATM cells transferred within the prescribed time intervals are successively written into areas of memory 32 corresponding to the designated circuits, VP and VC. When the amount of the data exceeds an assigned area, data acquisition may be stopped or stored data may be continuously renewed. After interruption is commanded, the corresponding contents of the memory 32 are read out according to a command from the call processing unit.

Figure 3:
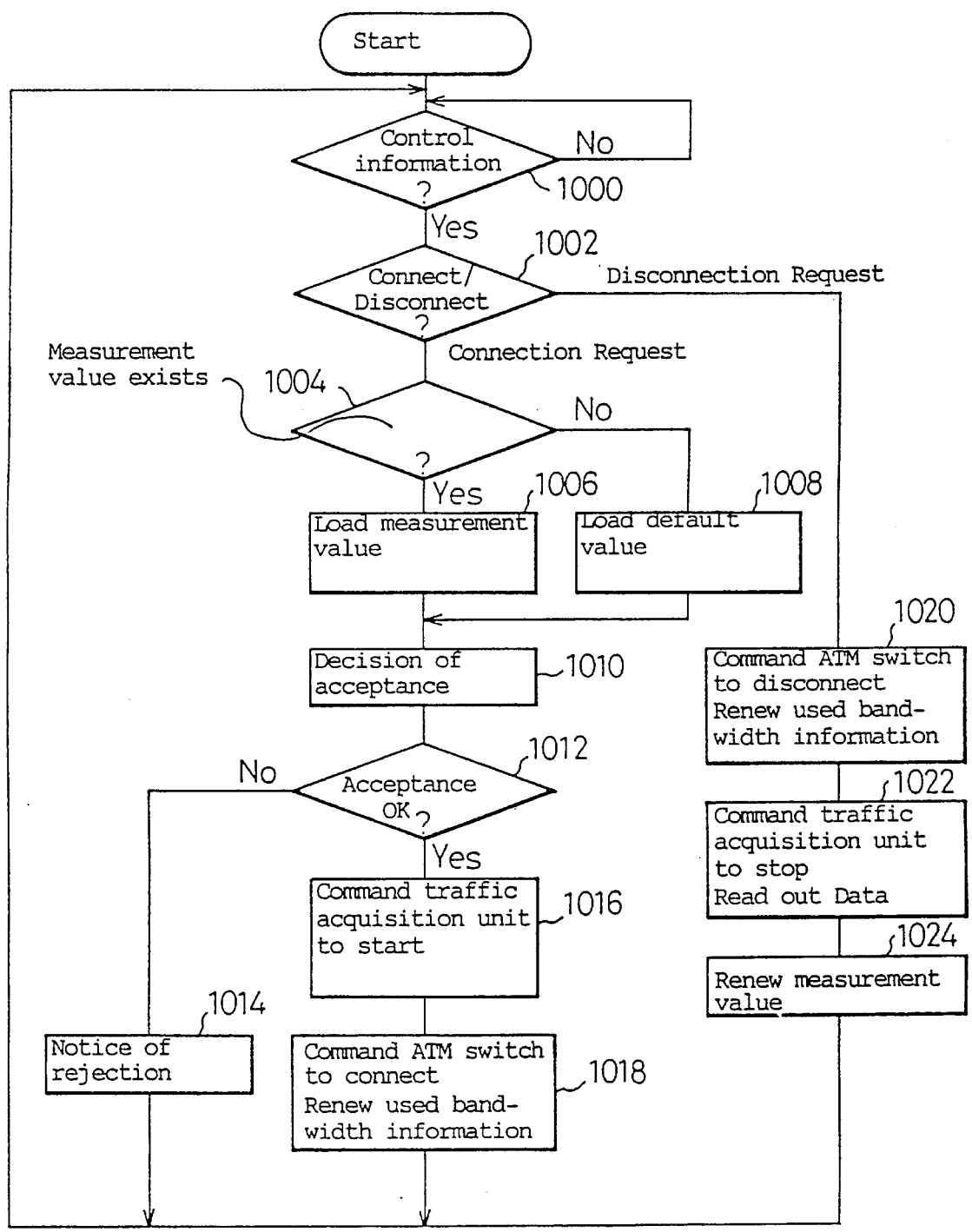
FIG. 3 is a flowchart showing an abstract of processing in the call processing unit 20.

The call processing unit 20 of FIG. 1 can be realized, for example, by a microprocessor provided with memory storage, a program and a desired input/output interface, etc. FIG. 3 is a flowchart showing an abstract of processing of the call processing unit 20.

In FIG. 3, first, it is decided whether control information from a user (same which means the as a subscriber) exists (step 1000). If the control information exists, the type of the control information is then decided what it (step 1002). In this case, the control information is either a call request or a disconnection request. If the control information is the call request, it is decided whether traffic measurement values (described later) used to determine propriety of acceptance of the request have been already stored in the data base 22 (step 1004). If the traffic measurement values have been already stored, the necessary measurement values are loaded (step 1006), and if not stored, corresponding default values (described later) are loaded (step 1008). Then, it is decided whether the call request can be accepted according to prescribed criteria (which is described later), using information with respect to bandwidths of connections which are already established, and the loaded measurement values or default values (step 1010). If the call request cannot be accepted, notification of rejection is made (step 1014). If the call request can be accepted, the call processing unit 20 sends a data acquisition start command including a circuit number, a VPI (Virtual Path Identifier) and a VCI (Virtual Channel Identifier) corresponding to the connection to the traffic acquisition unit 18 (step 1016). Next, the call processing unit 20 sends a command for setting-up a connection corresponding to the call request to the ATM switch 14, and renews information as to bandwidths of connections which are established (step 1018).

After that, when a communication ends and a disconnection request is received as control information from a user, that request is sensed in the step 1002. Then, the call processing unit 20 commands the ATM switch 14 to disconnect, and renews information concerning bandwidths of connections which are established (step 1020). In addition, the call processing unit 20 sends a stop command including a circuit number, the VPI and the VCI of the disconnected connection to the traffic acquisition unit 18, reads out the acquired data (step 1022), and renews the traffic values stored in the data base 22 using the read-out data, according to a prescribed procedure (which is described later).

Embodiment I

In a first embodiment of the present invention, the aforementioned traffic values are separately stored with respect to each user (subscriber). Furthermore, there is a situation in which information transmitted from a user is varied in nature, such as image, voice data addition, information having the same nature may be transmitted in different transmission rates (bandwidths) using different modems. Therefore, observed traffic values are separately stored with respect to each of types of media even regarding calls from a user.

The change in types of media is perceived by perceiving a change in values declared by a subscriber in a call request, because it is expected that a declared value that is automatically output from a terminal is changed when a type of a medium is changed. Therefore, in this case, observed values of traffic characteristics are separately stored according to the declared values. When the observed values have not yet been obtained, the declared values themselves are used as the default values.

FIGS. 4A to 4C show an example of a storage structure of the observed values in this case. First, it is assumed that a call request including declared values of average 10 Mb/s and peak 50 Mb/s is issued from a subscriber 2-6141. Assuming that the call request is accepted based on a decision made by using the declared values as default values, and assuming that traffic characteristics observed in a connection which is set up are average 30 Mb/s and peak 70 Mb/s, observed values: average 30 Mb/s and peak 70 Mb/s are stored in a column of the subscriber 2-6141 corresponding to declared values: average 10 Mb/s and peak 50 Mb/s, as shown in FIG. 4A. Next, it is assumed that a call request including declared values of average 64 Kb/s and peak 64 Kb/s is issued from the same subscriber. Since the same declared values are not stored as far as this subscriber is concerned, it is decided that a call using a new medium is requested, and therefore, an admission decision is made using the declared values as default values. Assuming that observed values in a connection which is set-up according to a result of the admission decision are average 64 Kb/s and peak 64 Kb/s, as shown in FIG. 4B, observed values: average 64 Kb/s and peak 64 Kb/s are stored in the column of the subscriber 2-6141 corresponding to declared values: average 64 Kb/s and peak 64 Kb/s. After that, if a call request including declared values of average 10 Mb/s and peak 50 Mb/s is issued, the admission decision is made using the observed values: average 30 Mb/s and peak 70 Mb/s which are stored corresponding to these values. Assuming that observed values in a connection which is set up according to a result of the admission decision are average 20 Mb/s and peak 60 Mb/s, as shown in FIG. 4C, the observed values stored in a column corresponding to declared values: average 10 Mb/s and peak 50 Mb/s are renewed by these values.

There is a case where the traffic characteristics vary in compliance with time periods of day even in the same subscriber and the same declared values (types of media). Therefore, observed traffic values may be further separately stored with respect to each of time periods of day, as shown in FIG. 5. In addition, even in the same subscriber and the same declared values (types of media), the traffic values may vary in compliance with the other party. Therefore, as shown in FIG. 6, observed traffic values may be separately stored with respect to each of called parties. Furthermore, as shown in FIG. 7, observed traffic values may be separately stored with respect to each of combination of time periods and called parties.

A method of calculating the observed values of the average values and the peak values is explained. After initiation of data acquisition is commanded in step 1016 of FIG. 3 and before interruption is commanded in step 1022, the numbers of ATM cells transferred within prescribed intervals are successively stored in the memory 32 of the traffic acquisition unit 18. In step 1022, these are read out, the average value is calculated by averaging these, and the peak value is obtained from a maximum among these.

Since the observed values are obtained every time communication is terminated, old observed values may be replaced every time new observed values are obtained. Alternatively, the observed values may be renewed by values obtained by averaging new observed values and past observed values. In latter case, as shown in FIG. 8, the number of observation times (communication times) is stored with the average value of the observed values, and a weighted average is calculated considering the number of samples.

In addition, as shown in FIG. 9, a total square of the observed values $X_i$, that is, $\Sigma X_i^2$ may be stored with the average value $\overline{X}$ and the observation times n, a variance is calculated from an equation:

$$\text{variance} = \frac{1}{n-1} \left( \sum_{i=1}^{n} X_i^2 - n\overline{X}^2 \right)$$

and the default value is used instead of the observed value while the variance exceeds a constant value.

Regarding the decision whether the call request can be accepted in the step 1010 of FIG. 3, average bandwidth or peak bandwidth for a connection newly requested is added to sum of average bandwidths or peak bandwidths for connections already established, and the decision is made according to whether or not the sum exceeds a prescribed maximum allowed bandwidth. The sum of average bandwidths or peak bandwidths for connections already established, which are used in the above calculation, is renewed in the step 1018 and the step 1020.

In the aforementioned examples, type of medium used by a subscriber issuing a call request is determined based on values declared by the subscriber, and observed values are separately stored with respect to each of declared values. Alternatively, if subscribers are arranged to declare the type of medium itself instead of the declared value, the observed values can be separately stored with respect to each of the declared media types. In this case, as shown in FIG. 10, forecasted values are stored with respect to each of types of media in the data base 22 in advance, and these values are used as default values before observed values are obtained. FIGS. 11 and 12 show an example of storage structure of observed values in this case. In FIGS. 11 and 12, V, P, and B are average value, peak value, and burst duration, respectively.

Embodiment II

According to Saito, H., "A Simplified Dimensioning Method of ATM networks", IEICE Technical Report, SSE-89-112 (1989), an upper limit $B_{up}$ of a cell loss rate B in an ATM network is given by the following equation.

$$B_{up} = \frac{1}{E[N(T)]} \int_{K}^{\infty} (x - K) \, dF_T(x) \tag{1}$$

where N(T) is the number of cells arriving within a period T, E[N(T)] is an average of N(T), and $F_T(x)$ is a distribution function for N(T). K is a buffer length, which is, for example, in a case of ATM switch, total number of buffers provided in a switch network. K is represented by the number of cells that the buffer can contain. T is a resident time (delay time) of cells while the buffer is filled with cells, and is given by K/(transfer rate of cell).

Assuming the following normal distribution as the distribution function $F_T(x)$:

$$\Phi(p) = \int_{-\infty}^{P} \frac{1}{\sqrt{2\pi}} \exp\left(-\frac{Z^2}{2}\right) dZ \tag{2}$$

and substituting it into equation (1), $$B_{up} = 1 - \Phi\left(\frac{K - m(T)}{\sigma(T)}\right) + \frac{\sigma(T)}{m(T)} \frac{1}{\sqrt{2\pi}} \exp\left\{-\frac{(K - m(T))^2}{2\sigma(T)^2}\right\} \approx 1 - \Phi\left(\frac{K - m(T)}{\sigma(T)}\right) \tag{3}$$

is obtained. Here, m(T) is E[N(T)], that is, an average value of N(T), and σ(T) is a standard deviation (root of variance) of N(T).

Thus, representing the required loss rate $B_0$ as $$B_0 = 1 - \Phi(P_0) = 1 - \int_{-\infty}^{P_0} \frac{1}{\sqrt{2\pi}} \exp\left(-\frac{Z^2}{2}\right) dZ \tag{4}$$

, a sufficient condition for the cell loss rate B to be smaller than the required loss rate $B_0$ is $$m(T)+P_0\sigma(T) \leq K \quad (5)$$

When the required loss rate $B_0$ is $10^{-9}$, $P_0$ is about 6. Since there is no correlation among each user traffic, representing average values of N(T) in each user traffic as $m_i(T)$ and standard deviations as $\sigma_i(T)$ (i=1, 2 ... n), entire m(T) and $\sigma(T)$ are calculated from $$m(T)=m_1(T)+m_2(T)+ \ldots +m_n(T) \quad \sigma^2(T)=\sigma_1^2(T)+\sigma_2^2(T)+ \ldots +\sigma_n^2(T) \quad (6)$$

Similarly, after a connection having traffic characteristics of average $m_j(T)$ and standard deviation $\sigma_j(T)$ is additionally accepted, the average value and the standard deviation become $$m(T) + m_j(T) \text{ and } \sqrt{\sigma^2(T) + \sigma_j^2(T)}$$

respectively. Therefore, a condition for admission is given as $$m(T) + m_j(T) + p_0 \sqrt{\sigma^2(T) + \sigma_j^2(T)} \leq K \quad (7)$$

The condition in inequality (7) is a condition for the upper limit $B_{up}$ of the loss rate B to be smaller than the required loss rate $B_0$. Since actual B is smaller than $B_{up}$, it is considered that there may be a case where the inequality (7) indicates rejection of a call request but in fact the call request can be accepted, there may be a case where another admission decision using maximum bandwidth can accept more connections. Therefore, as described below, it is preferable to forecast which of two methods of decision (one uses the inequality (7) and another uses the maximum bandwidth) can accept more connections, and to select a method of decision based on the forecast.

A condition for the admission decision using the maximum bandwidth is $$N_{p1}(T)+N_{p2}(T)+ \ldots +N_{pn}(T)=N_p(T) \leq K \quad (8)$$

or $$N_p(T)+N_{pj}(T) \leq K,$$

where $N_{pi}(T)$ (i=1, 2 ... n) is maximum of N(T) in each traffic source.

In an admission decision regarding a connection having traffic characteristics of average $m_j(T)$, standard deviation $\sigma_j(T)$ and maximum $N_{pj}(T)$, supposing that all of connections have the same traffic characteristics, and according to the condition of inequality (8), maximum number $n_p$ of acceptable connections is $$n_p=K/N_{pj}(T) \quad (9).$$

Substituting equation (9) into the condition of inequality (5) considering the equation (6), $$n_p m_j(T) + P_0 \sqrt{n_p} \ \sigma_j(T) \leq K \quad (10)$$

that is, $m_j(T) + P_0 \sigma_j(T) \sqrt{n_p / n_p} \leq K/n_p$ is obtained. In other words, satisfaction of a condition of the inequality (10) indicates that a number larger than $n_p$ possibly satisfies the inequality (10), i.e., that the decision of inequality (7) using average and standard deviation possibly accepts more connections than the decision of inequality (8) using maximum values. On the other hand, the fact that the condition of the inequality (10) is not satisfactory indicates that the decision of inequality (8) using maximum is advantageous. It should be noted that the inequality (5) is reduced to the inequality (8) if m(T) and $\sigma(T)$ is replaced by $N_p(T)$ and zero, respectively.

Accordingly, if an average value and the standard deviation of connections already established are m(T) and $\sigma(T)$, respectively, and a request of a connection having characteristics of average $m_j(T)$, standard deviation $\sigma_j(T)$ and maximum $N_{pj}(T)$ is issued, $n_p$ is calculated from equation (9), a condition of inequality (10) is decided, and admission decision is carried out according to inequality (7) if the condition of inequality (10) is satisfactory. Even if the condition of equation (10) is not satisfactory, admission decision is carried out according to inequality (7) after replacing $m_j(T)$ and $\sigma_j(T)$ by $N_{pj}(T)$ and zero, respectively. If the call request is accepted and a connection is set up, in both cases, m(T) and $\sigma(T)$ are renewed as $$m(T) \leftarrow m(T) + m_j(T) \quad (11)$$

$$\sigma(T) \leftarrow \sqrt{\sigma^2(T) + \sigma_j^2(T)}.$$

Next, calculation method of parameters $m_j(T)$, $\sigma_j(T)$ and $N_{pj}(T)$ is described. In the following description, subscript j is left out for simplicity.

In this embodiment, in order to obtain extremely accurate parameters within short periods by obtaining a great many samples within short periods, traffic data from the traffic acquisition unit 18 is summed up regardless of subscribers, time of day, and called parties, but only regarding types of media declared in call requests, to calculate average values, standard deviations, and peak values. The measurement periods in timer 28 of FIG. 2 are set to the aforementioned T.

Figure 13:
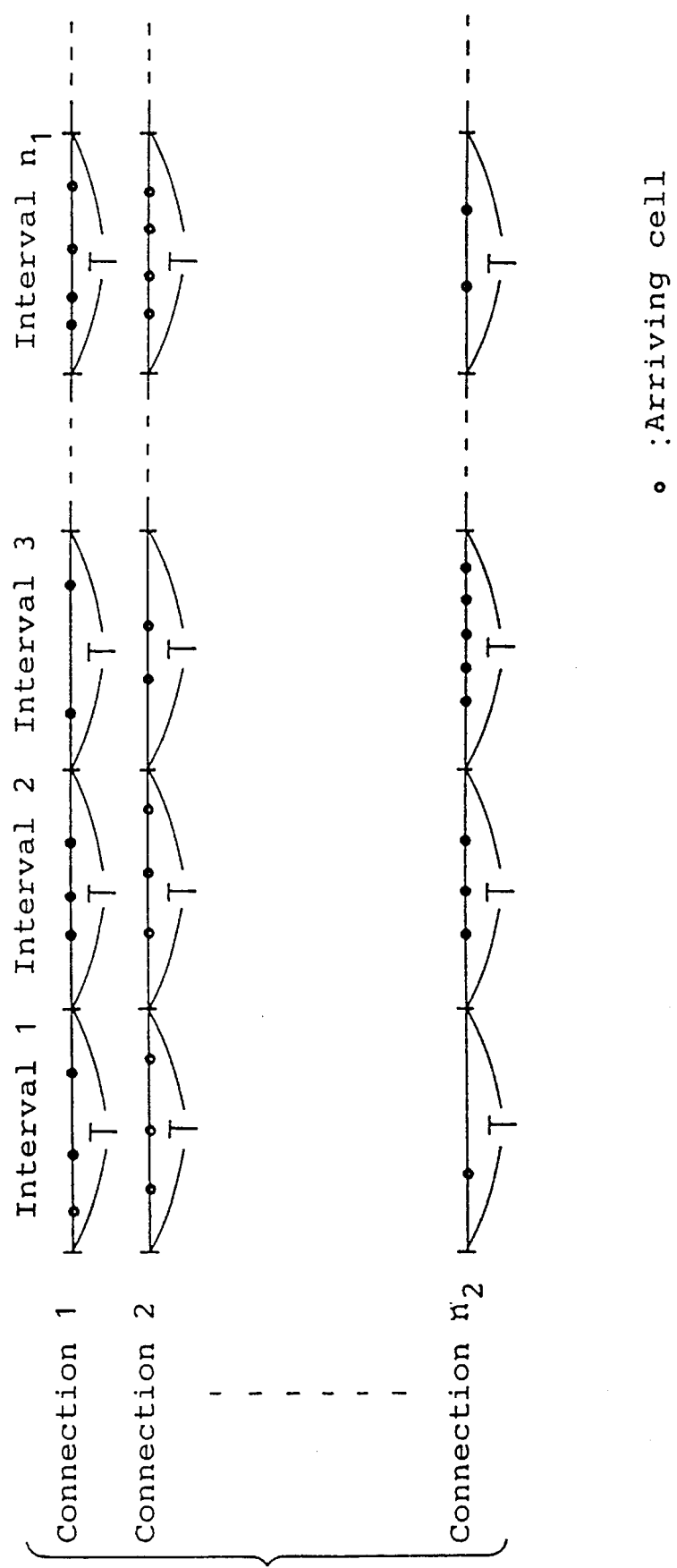
FIG. 13 is a diagram explaining an example of a method of sampling traffic data.

As shown in FIG. 13, regarding a medium type, arriving cells are counted with respect to $n_1$ (e.g. 100) intervals T for each connection, and the parameters m(T), $\sigma(T)$ and $N_p(T)$ are calculated using data for recently established $n_2$ (e.g. 100) connections. Representing the number of arriving cells in i-th interval T in j-th connection as $M_{ij}$, the parameters m(T), $\sigma(T)$ and $N_p(T)$ are calculated by $$m(T) = m^* + \theta \frac{S}{(n_1 n_2 - 1)^{1/2}} \quad (12)$$

$$\sigma^2(T) = S^2 \frac{n_1 n_2}{n_1 n_2 - 1} + \zeta S^2 \frac{n_1 n_2}{n_1 n_2 - 1}$$

$$N_P(T) = N_P^* + \xi \frac{S_P}{(n_2 - 1)^{1/2}},$$

where $$m^* = \sum_i \sum_j (M_{ij}/n_1 n_2) \quad (13)$$

$$S^2 = \sum_i \sum_j \{(M_{ij} - m^*)^2/n_1 n_2\}$$

$$N_P^* = \sum_j \text{Max}_i \ [M_{ij}]/n_2$$

$$S_P^2 = \sum_j \left( \text{Max}_i \ [M_{ij}] - N_P^* \right)^2 /n_2$$

$\theta$ and $\xi$ are corrections for measurement error distributions of m(T) and $N_p(T)$ both of which represent t-distribution, and $\zeta$ is a correction for measurement error distribution of $\sigma^2(T)$ which represents $\chi^2$-distribution. When a measurement error is 1%, $\theta=\xi\approx 2.6$ and $\zeta\approx 0.5$.

Since the parameters $m(T)$, $\sigma(T)$ and $N_p(T)$ cannot be calculated until $n_2$ connections are established with respect to each medium type, default values are stored with respect to each media types and the default values are used until observed values are obtained, similar to the description with reference to FIG. 10. As the default values, maximum values $N_p(T)$ are stored for $m_j(T)$ and an admission decision is made using the $m_j(T)$, and $\sigma_j(T)=0$. After $n_2$ connections are established regarding a medium type, calculation is carried out from data of recent $n_2$ connections regarding the same medium type.

Figure 14:
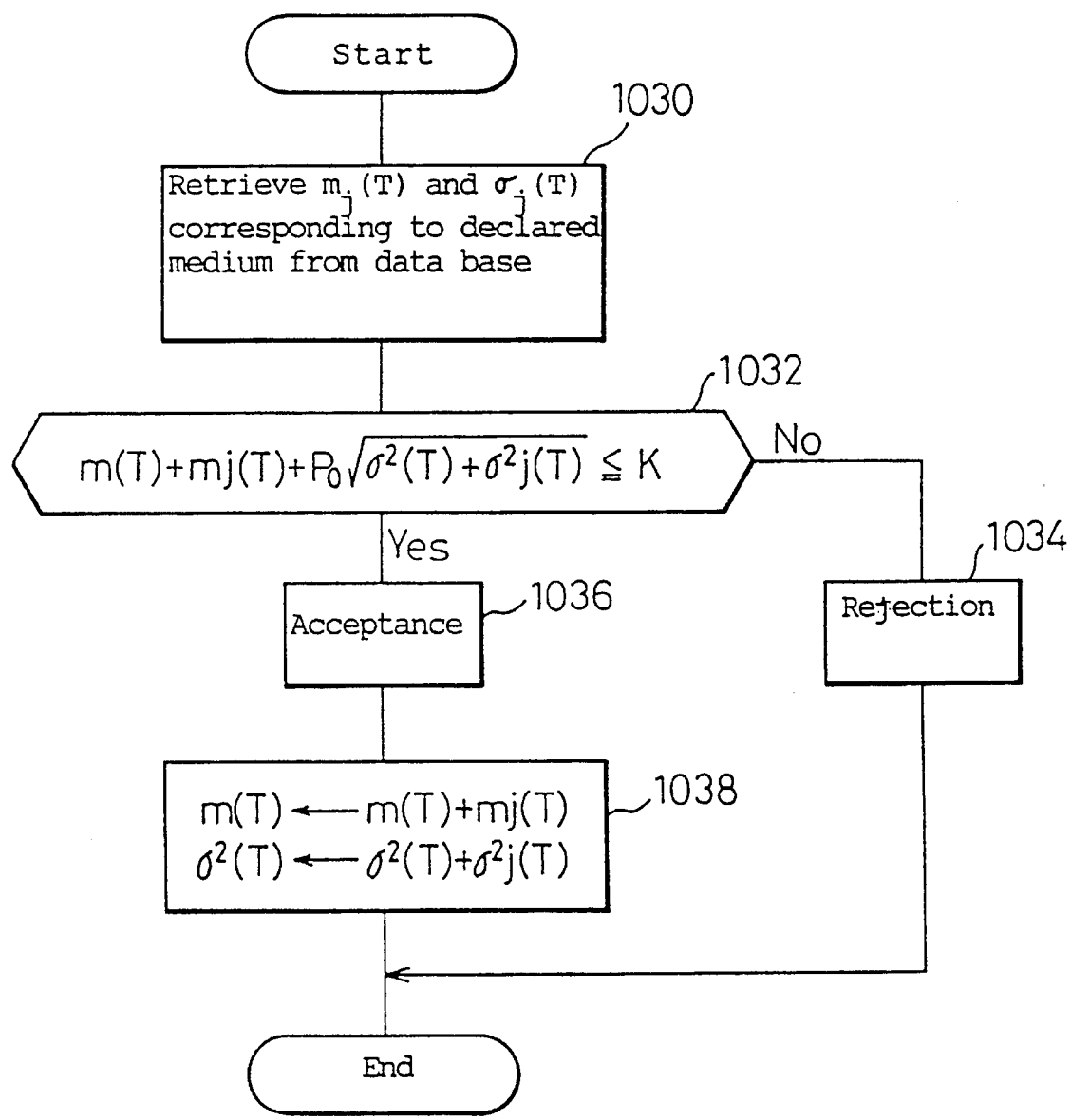
FIG. 14 is a flowchart showing a detail of an example of an admission decision process and a renewing process.
Figure 15:
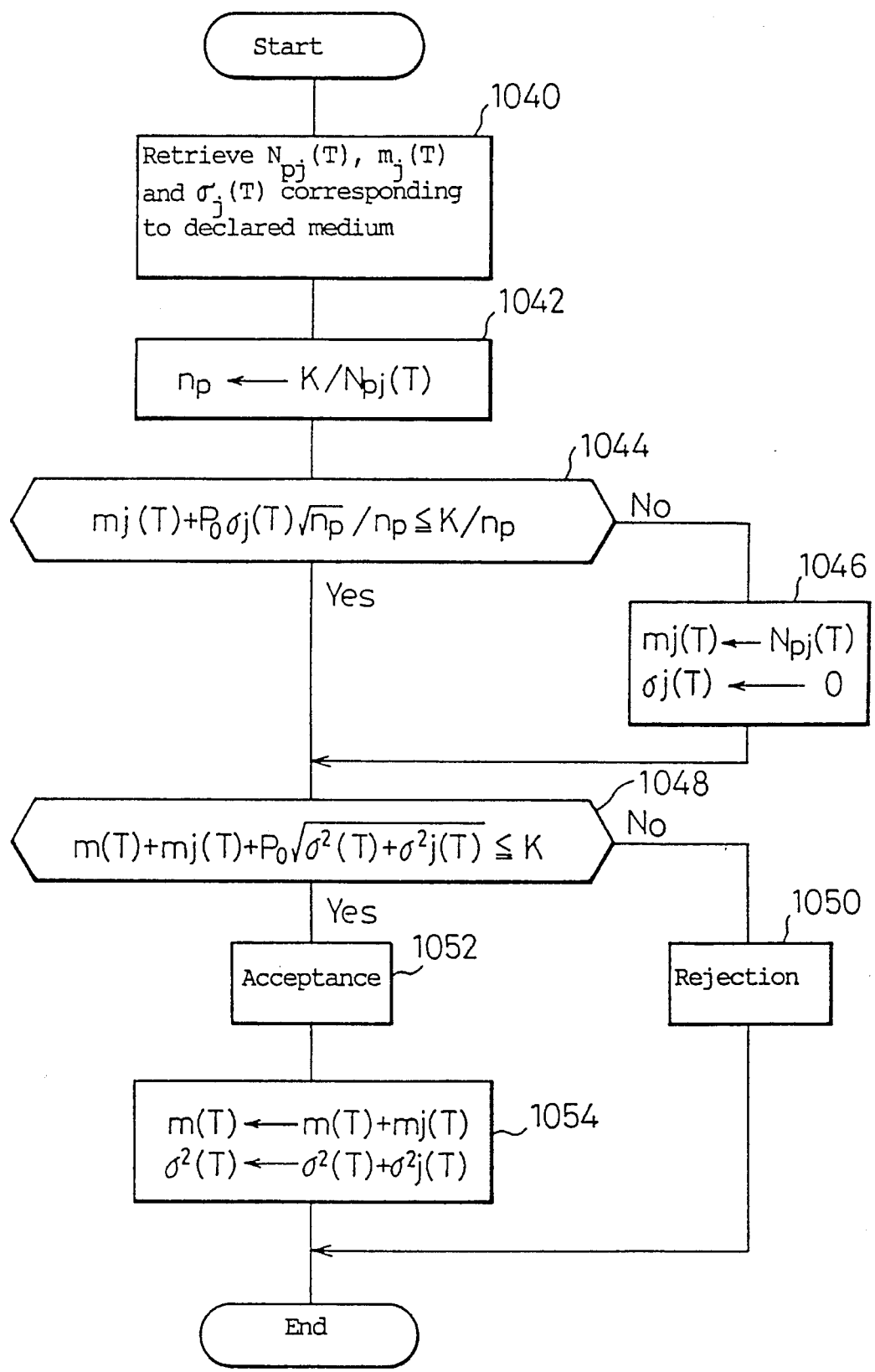
FIG. 15 is a flowchart showing a detail of another example of an admission decision process and a renewing process.

FIGS. 14 and 15 are flowcharts showing a process in this embodiment in detail, regarding the steps 1006, 1008, 1010 and 1018 of FIG. 3. FIG. 14 shows a case where the admission decision is carried out using the average values and standard deviations only based on the inequality (7). FIG. 15 shows a case where one of the admission decisions using average values and standard deviations and the admission decision using peak values is selected according to the decision of inequality (10).

In FIG. 14, when a call request is issued, values of $m_j(T)$ and $\sigma_j(T)$ stored corresponding to a type of medium declared at the same time are retrieved from the data base 22 (step 1030). If the values are not stored, default values are read out. The admission decision is made according to inequality (7) (step 1032), and notification of rejection is made if the request can not be accepted (step 1034). If the request can be accepted, a connection is set up (step 1036) and $m(T)$ and $\sigma(T)$ are renewed according to the formula (11) (step 1038).

In FIG. 15, after retrieval of the parameters (step 1040), $n_p$ is calculated according to equation (9) (step 1042), and a decision is made according to inequality (10) (step 1044). If a condition of inequality (10) is not satisfied, substitution of parameters is carried out (step 1042). The steps following are the same as in FIG. 14.

We claim:

1. A call admission control method, in a switch system, for deciding admission of a call request, from a terminal station, requesting establishment of a connection in a network, comprising the steps of:

observing traffic characteristics with respect to each connection which is already established;

storing observed values of the traffic characteristics according to a type of the connection;

substituting observed values corresponding to a type of connection required by the call request for prescribed default values of traffic characteristics when the observed values are stored; and deciding propriety of a call admission in response to the call request, based on the substituted values when the observed values are stored, and based on the default values when the observed values are not stored.

2. A method as claimed in claim 1, wherein in the storing step, the observed values are separately stored with respect to each of subscribers and each of declared values of traffic characteristics included in call requests for the observed connections, and wherein in the deciding step, the default values are declared values included in the call requests.

3. A method as claimed in claim 2, wherein in the storing step, the observed values are further separately stored with respect to each of time zones of the day in which the observed values are observed.

4. A method as claimed in claim 2, wherein in the storing step, the observed values are further separately stored with respect to each called party.

5. A method as claimed in claim 1, wherein in the storing step, the observed values are stored in place of observed values already stored and having the same type if they exist.

6. A method as claimed in claim 1, wherein in the storing step, a number of times of observation is stored corresponding to the observed values, and averaged observed values obtained by calculating weighted averages using the number of times of observation corresponding to the observed values having an identical type, if they exist, are stored.

7. A method as claimed in claim 1, wherein in the storing step, a total square of the observed values is stored, and wherein in the deciding step, a variance of the observed values is calculated from the total square, an average value of the observed values and the number of times of observation, and a decision is made using the default values while the variance exceeds a prescribed value.

8. A method as claimed in claim 1, wherein in the storing step, the observed values are separately stored with respect to each of the subscribers and each of information types included in call requests for observed connections, and wherein in the deciding step, the default values are stored according to the information types in advance.

9. A method as claimed in claim 1, wherein in the observing step, the traffic characteristics observed in the observing step include averages and standard deviations of numbers of cells arriving at prescribed periods, and wherein in the deciding step, a decision of the call admission is made based on the averages and the standard deviations.

10. A method as claimed in claim 9, wherein the deciding step includes the substep of determining that the call request can be accepted if an inequality $$m(T) + m_j(T) + P_0 \sqrt{\sigma^2(T) + \sigma_j^2(T)} \leq K$$

is satisfied, where $m(T)$ is a sum of the averages with respect to established connections, $\sigma^2(T)$ is a total square of the standard deviations with respect to established connections, $m_j(T)$ is the average with respect to a connection required by the call request $\sigma_j^2(T)$ is a square of the standard deviation with respect to a connection required by the call request, and $P_0$ and $K$ are a first and a second constant, respectively.

11. A method as claimed in claim 10, wherein in the observing step, the observed traffic characteristics further include a maximum of the numbers of cells arriving at the prescribed periods, and the deciding step further includes the substeps of calculating $n_p$ based on $n_p=K/N_{pj}(T)$, where $N_{pj}(T)$ is the maximum with respect to a connection required by the call request, and replacing $m_j(T)$ and $\sigma(T)$ by $N_{pj}(T)$ and zero, respectively, before the determining substep, if an inequality $$m_j(T) + P_0 \sigma_j(T) \sqrt{n_p} \ln n_p \leq K/n_p$$

is not satisfied.

12. A method as claimed in claim 10, wherein the second constant $K$ is a number of cells contained in a buffer, the prescribed periods are as long as a resident time of cells while the buffer is filled with the cells, and the first constant $P_0$ is determined by a formula $$B_0 = 1 - \int_{-\infty}^{P_0} \frac{1}{\sqrt{2\pi}} \exp\left(-\frac{Z^2}{2}\right) dZ,$$

where $B_0$ is a required cell loss rate.

13. A method as claimed in claim 12, wherein in the storing step, the observed values are stored according to information types included in call requests as to each observed connections, and wherein in the deciding step, the default values are stored according to the information types in advance.

14. A method as claimed in claim 13, wherein in the observing step, the averages and the standard deviations are calculated from the numbers of cells arriving in a prescribed number of the prescribed periods with respect to each of a prescribed number of connections that are finally established for the information type.

15. A switch system for deciding admission of a call request, from a terminal station, requesting establishment of a connection in a network, said switch system comprising:

a call admission controller comprising:
observing means for observing traffic characteristics with respect to each of connections which are already established;
storing means for storing observed values of the traffic characteristics according to a type of the connection;
means for substituting observed values corresponding to a type of connection required by the call request for prescribed default values of traffic characteristics when the observed values are stored; and
deciding means for deciding propriety of a call admission in response to the call request, based on the substituted values when the observed values are stored, and based on the default values if the observed values are not stored.

16. A switch system as claimed in claim 15, wherein the storing means separately stores the observed values with respect to each subscriber and each of the declared values of the traffic characteristics included in call requests for the observed connections, and wherein the default values used by the deciding means are declared values included in the call requests.

17. A switch system as claimed in claim 16, wherein the observed values stored in the storing means are further separately stored with respect to each of time zones of the day in which the values are observed.

18. A switch system as claimed in claim 16, wherein the observed values stored in the storing means are further separately stored with respect to each of called parties.

19. A switch system as claimed in claim 15, wherein the storing means stores the observed values in place of observed values of an identical type already stored, if they exist.

20. A switch system as claimed in claim 15, wherein the storing means stores the number of times of observation corresponding to the observed values, and stores averaged observed values obtained by calculating weighted averages using the number of times of observation corresponding to the observed values of an identical type, if they exist.

21. A switch system as claimed in claim 15, wherein the storing means stores a sum of the squares of the observed values, and wherein the deciding means calculates a variance of the observed values from the sum of the squares, an average value of the observed values and the number of times of observation, and makes a decision using the default values while the variance exceeds a prescribed value.

22. A switch system as claimed in claim 15, wherein the storing means separately stores the observed values with respect to each of subscribers and each of information types included in call requests for observed connections, and wherein the default values used by the decision means are stored according to the information types in advance.

23. A switch system as claimed in claim 15, wherein the traffic characteristics observed by the observing means include averages and standard deviations of numbers of cells arriving at prescribed periods; and wherein the deciding means decides the call admission based on the averages and the standard deviations.

24. A switch system as claimed in claim 23, wherein the deciding means comprises means for determining that the call request can be accepted if an inequality $$m(T) + m_j(T) + P_0 \sqrt{\sigma^2(T) + \sigma_j^2(T)} \leq K$$

is satisfied, wherein $m(T)$ is a sum of averages with respect to established connections, $\sigma^2$ is a sum of squares of standard deviations with respect to the established connections, $m_j(T)$ is average with respect to a connection required by the call request, $\sigma_j^2(T)$ is a square of the standard deviation with respect to a connection required by the call request, and $P_0$ and $K$ are a first and a second constants, respectively.

25. A switch system as claimed in claim 24, wherein the traffic characteristics observed by the observing means further comprise a maximum of the numbers of cells arriving at the prescribed periods, and the deciding means further comprises:

means for calculating $n_p$ based on $n_p = K/N_{pj}(T)$, where $N_{pj}(T)$ is the maximum with respect to a connection required by the call request, and means for replacing $m_j(T)$ and $\sigma_j(T)$ by $N_{pj}(T)$ and zero, respectively, before the determining substep, if an inequality $$m_j(T) + P_0 \sigma_j(T) \sqrt{n_p}/n_p \leq K/n_p$$

is not satisfied.

26. A switch system as claimed in claim 24, wherein the second constant $K$ is the number of cells contained in a buffer, the prescribed periods are as long as a resident time of the cells while the buffer is filled with the cells, and the constant $P_0$ is determined by a formula $$B_0 = 1 - \int_{-\infty}^{P_0} \frac{1}{\sqrt{2\pi}} \exp\left(-\frac{Z^2}{2}\right) dZ,$$

where $B_0$ is a required cell loss rate.

27. A switch system as claimed in claim 26, wherein the storing means stores the observed values according to information types included in call requests as to each observed connections, and wherein the default values used by the deciding means are stored according to the information types in advance.

28. A switch system as claimed in claim 27, wherein the observing means calculates the averages and the standard deviations from the numbers of cells arriving in a prescribed number of the prescribed periods with respect to each of a prescribed number of connections that are finally established for identical information types.

29. A call admission control method, in a switch system, for deciding admission of a call request, from a terminal station, requesting establishment of a call connection in a network, comprising the steps of:

measuring traffic characteristics with respect to a call connection which is established;

storing measured values of the traffic characteristics according to a type of the call connection after the call connection is terminated; and deciding propriety of a call admission in response to a call request, based on measured values corresponding to a type of call connection required by the call request if the measured values are stored, and based on prescribed default values if the measured values are not stored.

30. A switch system for deciding admission of a call request, from a terminal station, requesting establishment of a call connection in a network, said switch system comprising:

measuring means for measuring traffic characteristics with respect to call connections which are established;

storing means for storing measured values of the traffic characteristics according to a type of the connection after the call connection is terminated; and deciding means for deciding propriety of a call admission in response to a call request, based on measured values corresponding to a type of a call connection required by the call request if the measured values are stored, and based on prescribed default values if the measured values are not stored.

31. A switch system for deciding admission of a call request, from a terminal station, requesting establishment of a call connection in a network, said switch system comprising:

measuring means for measuring traffic characteristics with respect to a call connection established in response to a first call request from the subscriber;

storing means for storing measured values of the traffic characteristics of the call connection after the call connection is terminated; and deciding means for deciding propriety of a call admission in response to a second call request from the subscriber, based on measured values of the call connection established in response to the previous first call request from the subscriber if the measured values are stored.

32. A switch system as claimed in claim 31, wherein the deciding means decides propriety of a call admission in response to the second call request from the subscriber, based on the prescribed default values if the measured values are not stored.

* * * * *

UNITED STATES PATENT AND TRADEMARK OFFICE
CERTIFICATE OF CORRECTION

PATENT NO. : 5,594,717
DATED : Jan. 14, 1997
INVENTOR(S) : WATANABE et al.

It is certified that error appears in the above-indentified patent and that said Letters Patent is hereby corrected as shown below:

TITLE PAGE: [73] Assignee, change "Kanagawa" to --Kawasaki--.

Col. 3, line 67, change "(same which means the" to --(which means the same--.

Col. 4, line 44, after "data" insert --. In--.

Col. 7, line 21 (equation (7)), change "$_{p0}$" to --$P_0$--.

Col. 10, line 56 (claim 11, line 9), change "$\sigma(T)$" to --$\sigma_i(T)$--.

Signed and Sealed this

Seventeenth Day of February, 1998

Attest:

BRUCE LEHMAN

Attesting Officer        Commissioner of Patents and Trademarks